United States Patent Office 2,953,545
Patented Sept. 20, 1960

2,953,545

PROCESS FOR CURING GLYCIDYL POLYETHERS AND PRODUCTS PRODUCED THEREBY

Arnold B. Finestone, West Newton, Mass., assignor to Westinghouse Electric Corporation, East Pittsburgh, Pa., a corporation of Pennsylvania No Drawing. Filed Nov. 18, 1958, Ser. No. 774,592

9 Claims. (Cl. 260—47)

This invention relates to a process for curing glycidyl polyethers to form hardened resins particularly well adapted for use as electrical insulation, and to the products produced thereby.

Glycidyl polyethers, also known as epoxy resins, have excellent chemical resistance, low moisture permeability and superior adhesive properties all of which make said resins particularly well suited for use as adhesive sealing compounds, casting resins and surface coatings. Generally, glycidyl polyethers have been cured to hard resins by heating the same in the presence of catalytic amounts of an amine or an acid anhydride. Numerous disadvantages have resulted from such prior art curing practices.

The amine type catalysts, such as diethylenetriamine and dimethylamine, are extremely fast acting catalysts when used in association with glycidyl polyethers. As a result, such resins must be used almost immediately after the catalyst has been admixed therewith. Any unused catalyzed resinous mixture must be discarded to prevent the same from hardening within the mixing container. Furthermore, many of the amines which have been used heretofore are toxic and volatile and certain of them have quite unpleasant odors.

Of the acid anhydride materials which may be used, maleic anhydride and phthalic anhydride have enjoyed the most widespread acceptance as curing catalysts for epoxy resins. Like the amine catalyst, however, the acid anhydrides when admixed with epoxy resins provide liquid mixtures having a relatively short shelf life. A further disadvantage of acid anhydride catalysts lies in the fact that they must be admixed with the resins at elevated temperatures to insure complete solution therein. On subsequent cooling, however, precipitation of the catalytic material frequently occurs.

The object of this invention is to provide mixtures of glycidyl polyethers and curing catalysts comprising a nitrogen coordinated silicon compound and at least one boron ester selected from the group consisting of borates and boronates, which mixtures are stables for prolonged periods at room temperature and will react readily at elevated temperatures to provide cured resinous products.

Another object of this invention is to provide a process for curing glycidyl polyethers by heating the same at elevated temperatures in the presence of a curing catalyst comprising a nitrogen coordinated silicon compound and at least one boron ester selected from the group consisting of borates and boronates.

A further object of this invention is to provide electrical members insulated with a resinous composition comprising the cured product obtained by heating and reacting a glycidyl polyether together with a catalyst including a nitrogen coordinated silicon compound and at least one boron ester selected from the group consisting of borates and boronates.

Other objects of this invention will, in part, be obvious and will, in part, appear hereinafter.

For a better understanding of the nature and the objects of this invention, reference should be had to the following detailed description.

Broadly, the foregoing objects are attained in accordance with the present invention by admixing reactive glycidyl polyethers with a curing catalytic composition comprising a nitrogen coordinated silicon compound and at least one boron ester selected from the group consisting of borates and boronates. The mixture is highly stable at room temperatures, yet will cure rapidly at temperatures within the range of from about 100° C. to 200° C. to form hard, tough resinous products which have excellent electrical insulating properties.

More specifically, this invention provides a process which comprises admixing a glycidyl polyether with (a) from 2% to 25%, by weight, based on the weight of the glycidyl polyether, of at least one nitrogen coordinated silicon compound and (b) from 2% to 20%, by weight, based on the weight of the glycidyl polyether, of at least one boron ester selected from the group consisting of borates having the formula

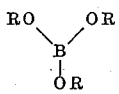

and boronate esters having the formula

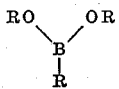

wherein R represents a radical selected from the group consisting of alkyl, aryl, and cycloalkyl groups; and heating the mixture at temperatures within the range of from about 100° C. to about 200° C. or slightly higher to produce a hard, cured resinous product.

It is desirable to combine sufficient of the boron ester to provide about one mol of boron therefrom per mol of nitrogen in the nitrogen coordinated silicon compound. However, these proportions may be departed from. Good curing has been secured when the nitrogen coordinated silicon compound introduced mols of nitrogen in excess of the mols of boron from the boron ester, up to a 4 to 1 ratio. A substantial excess of boron ester ordinarily need not be employed because it does not produce any proportional benefit.

Mixtures of glycidyl polyethers in combination with the mixture of curing agents of this invention have extremely long shelf life at room temperatures. That is, they do not gel even after several months storage at room temperature (20° C. to 30° C.) yet will cure to the solid state after only a few hours heating at 135° C., for example, or after having been heated to a temperature of about 200° C. for a period of about one hour.

The boron esters which form a part of the curing catalyst of this invention are the esters of boric acid and the esters of the boronic acids.

The esters of boric acid are referred to as borates and are well known in the art. The borates include those materials having the structural formula

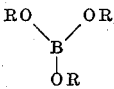

where R may be an alkyl radical including, for example, methyl, ethyl, propyl, isopropyl, butyl and isobutyl; a cycloalkyl radical including, for example, cyclohexyl; or an aryl radical including, for example, benzyl, phenyl and methyl-phenyl. Two or three different radicals may be present in a single borate.

Some specific examples of borates are ethyl borate, n-propyl borate, butyl borate, cyclohexyl borate, tri-m-cresyl borate and isopropyl borate.

Polyborate esters, compounds which contain at least two boron atoms may also be employed to form a part of the curing catalyst of this invention. Examples of polyborate esters are trihexylene glycol biborate, tri (octylene glycol) biborate, and hexylene glycol biborate. Reference is hereby made to application Serial No. 749,287, filed July 17, 1958 and assigned to the assignee of the present invention for a full and complete description of polyborate esters.

The esters of the boronic acids are referred to as boronates and are well known in the art. The boronates include those materials having the structural formula

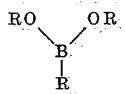

where R may be an alkyl radical including, for example, methyl, ethyl, propyl, isopropyl, butyl and isobutyl; a cycloalkyl radical including, for example, cyclohexyl; or an aryl radical including, for example, benzyl, phenyl and methyl-phenyl. Two or three different radicals may be present in a single boronate.

Some specific examples of boronates are n-propyl methaneboronate, n-butyl benzeneboronate, ethyl methaneboronate, n-propyl benzeneboronate, and n-propyl ethaneboronate.

The nitrogen coordinated silicon compound portion of the curing catalyst employed in accordance with this invention comprises the reaction product derived by reacting from one mol to two mols of an alkanolamine and one mol of an organosilicon compound. It is desirable, in order to produce selected compounds, that either precisely one mol or two mols of alkanolamine be employed for each mol of the organosilicon compound. Any excess of alkanolamine employed over two mols will only necessitate its removal after the reaction is completed.

In preparing the nitrogen coordinated compound for use in this invention, the organosilicon compounds employed are those that have the formula $$(R)_{4-n}-Si-(OR)_n$$

wherein $n$ is an integer having a value of from 1 to 4, inclusive. R may be an alkyl radical including, for example, methyl, ethyl, propyl, isopropyl, butyl and isobutyl; an aryl radical including, for example, phenyl, benzyl, methyl phenyl and chlorophenyl; or a cycloalkyl radical including, for example, cyclohexyl.

Table I below lists several specific examples of organosilicon compounds that may be used to prepare the nitrogen coordinated silicon compounds employed in this invention.

*Table I*

[Organosilicon compounds having the formula:
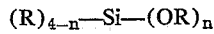

| $n=4$ | $n=3$ | $n=2$ | $n=1$ |
|---|---|---|---|
| methyl orthosilicate. | methyltriethoxysilane. | dimethyldimethoxysilane. | triethylethoxysilane. |
| ethyl orthosilicate. | ethyltriethoxysilane. | dimethyldiethoxysilane. | trimethylethoxysilane. |
| propyl orthosilicate. | propyltriethoxysilane. | diethyldiethoxysilane. | triethylphenoxysilane. |
| 2-ethylbutyl orthosilicate. | ethyltrimethoxysilane. | methylphenyldiethoxysilane. | trimethyl methoxysilane. |
| | phenyltriethoxysilane. | diphenyldiethoxysilane. | |
| | | methylethyldiethoxysilane. | |
| | | diethyldiphenoxysilane. | |

The alkanolamines, also referred to as amino-alcohols, employed in preparing the nitrogen coordinated silicon compound for use in this invention, are selected from the group consisting of mono-, di-, and tri-alkanolamines in which the groups attached to the nitrogen comprise at least one alkanol radical and the balance, if any, are members of the group consisting of hydrogen or hydrocarbon radicals. The hydrocarbon radicals are selected from the group consisting of alkyl radicals, cycloalkyl radicals and aryl radicals.

Table II below sets forth examples of some of the alkanolamines that may be employed in preparing the nitrogen coordinated silicon compounds used in this invention.

*Table II*

ALKANOLAMINES

| mono- | di- | tri- |
|---|---|---|
| mono-ethanolamine. | diethanolamine. | triethanolamine. |
| mono-isopropanolamine. | diisopropanolamine. | triisopropanolamine. |
| N,N-diethyl ethanolamine. | N-methyl diethanolamine. | |
| N,N-diphenyl ethanolamine. | N-ethyl diethanolamine. | |
| N,N-dimethyl isopropanolamine. | N-phenyl diethanolamine. | |
| | N-methyl diisopropanolamine. | |

The mono-, di- and tri-ethanolamines and isopropanol amines may be represented by the formula

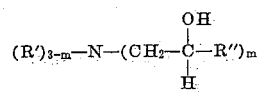

wherein $m$ is an integer having a value of from 1 to 3 inclusive. R' may be hydrogen or a hydrocarbon radical such as an alkyl radical including, for example, methyl, ethyl, propyl and isopropyl; or an aryl radical including, for example, phenyl, methyl-phenyl and chlorophenyl. R'' may be hydrogen or the methyl radical.

In preparing the nitrogen coordinated silicon compounds, the desired amount of reactants is placed in a suitable reaction vessel where the reactants are thoroughly admixed and heated to reflux. Reflux is continued until a predetermined amount of monohydric alcohol, one of the products of the reaction, is removed. The nitrogen coordinated silicon reaction product is then recovered. The nitrogen coordinated silicon compound will be a crystalline solid or a liquid depending on the reactants employed and the amount of the reactants employed. The crystalline solid compound may be purified by recrystallization from a solvent or by other conventional means, if desired. It has been found in preparing the nitrogen coordinated silicon compounds that the resulting reaction product may comprise the monomer or a low molecular weight polymer thereof, such, for example, as the dimer or trimer.

When the reactants are reacted on a 1 to 1 molar basis, it is desirable to continue refluxing the reactants until all the monohydric alcohol reaction product capable of being formed by the reaction has been removed. This is done in order to produce a strong coordinate bond between the nitrogen and silicon.

In carrying out the reaction and employing two mols of alkanolamine and one mol of organosilicon compound, it is only necessary to proceed with the reaction until at least two mols of the alcohol reaction product are removed. In some cases, the nature of the reactants is such that it is possible to produce more than two mols of the monohydric alcohol reaction product, and the reaction may be further carried out to accomplish this removal. This point is fully explained and is illustrated in Example I of application Serial No. 751,632, filed July 29, 1958, and assigned to the assignee of the present invention. Reference is hereby made to application Serial No. 751,632 for a full and complete disclosure of nitrogen coordinated silicon compounds and their method of preparation.

The following examples are illustrative of some of the nitrogen coordinated silicon compounds that may be employed in this invention. Other nitrogen coordinated silicon compounds that may be employed are described in application Serial No. 751,632 hereinbefore referred to.

EXAMPLE I

The following materials are charged into a three-neck, one liter flask fitted with a thermometer, stirrer and Dean-Stark trap with condenser. The Dean-Stark trap serves to remove the azeotropic mixture from the flask.

Triethanolamine _____ 74.5 grams (0.5 mol)
Phenyltriethoxysilane _____ 120 grams (0.5 mol)
Benzene (azeotropiser) _____ 500 milliliters The reactants are admixed thoroughly and heated slowly to reflux. Reflux is continued until substantially all the ethanol, one of the reaction products, is removed by azeotropic distillation. The reaction product remaining in the flask is dissolved in hot benzene and recrystallized therefrom. The recrystallized compound, phenyltriethanolaminesilane, is a white crystalline solid having a melting point of 203.6° C. to 204.2° C. This compound has a strong nitrogen to silicon coordinate bond. This compound has been determined to have the structural formula

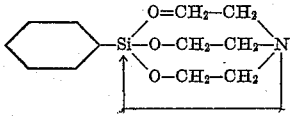

EXAMPLE II

The following ingredients are reacted in apparatus similar to that used in Example I:

Triethanolamine _____ 149 grams (1 mol)
Ethyl orthosilicate _____ 208 grams (1 mol)
Benzene (azeotropiser) _____ 400 milliliters The reaction product, ethoxytriethanolaminesilane, is a white crystalline solid having a melting point of 35° C. to 37° C. This compound has a strong nitrogen to silicon coordinate bond and may be represented by the structural formula

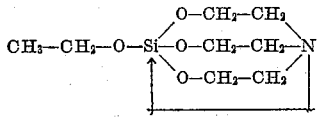

EXAMPLE III

The following ingredients are reacted in apparatus similar to that employed in Example I:

Triethanolamine _____ 298 grams (2 mols)
Ethyl orthosilicate _____ 208 grams (1 mol)

The reactants are thoroughly admixed and heated slowly to reflux. Reflux is continued until four mols of ethanol are distilled off. The reaction product remaining in the flask is a liquid. The reaction product has the structural formula

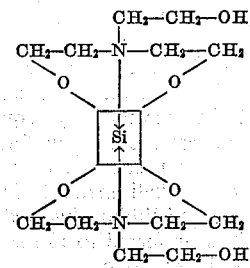

EXAMPLE IV

Employing the apparatus of Example I, the following ingredients are reacted:

N-methyldiethanolamine _____ 119 grams (1 mol)
Ethyl orthosilicate _____ 104 grams (0.5 mol)

The ingredients are thoroughly admixed and heated slowly to reflux. Reflux is continued until two mols of ethanol are removed. The reaction product remaining in the flask is a liquid and has the structural formula

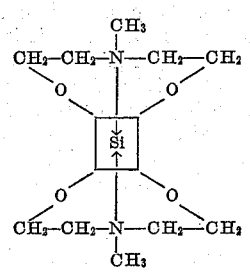

EXAMPLE V

The following ingredients are charged into a three-neck, one-half liter flask with attachments employed in Example I:

N-methyldiethanolamine _____ 60 grams (0.5 mol)
Diethoxy methylphenylsilane ____ 105 grams (0.5 mol)

refluxed until 1 mol of ethanol is removed. The reaction product N-methyldiethanolamine methylphenylsilane remaining in the flask is a liquid and has the structural formula

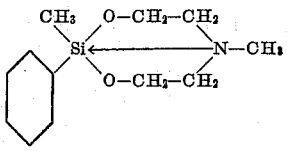

In preparing the resinous compositions of this invention according to one preferred procedure, there is employed, a resinous polymeric epoxide or glycidyl polyether. The epoxide resins may be prepared by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such, for example, as 4,4'-dihydroxy-diphenyl-dimethyl-methane (referred to hereinafter as bisphenol "A") and 4,4'-dihydroxy-diphenyl-methane. In admixture with the named polynuclear phenols, use also may be made of those polynuclear phenols wherein the phenol nuclei are joined by sulfur bridges such, for example, as 4,4'-dihydroxy-diphenyl-sulfone.

While it is preferred to use epichlorohydrin as the epihalohydrin in the preparation of the resinous polymeric epoxide starting materials of the present invention, other epihalohydrins, for example, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The resinous polymeric epoxide suitable for use in this invention has a 1,2-epoxy equivalency greater than 1.0. By epoxy equivalency reference is made to the number of 1,2-epoxy groups contained in the average molecule of the glycidyl ether.

Owing to the method of preparation of the glycidyl polyethers and the fact that they are ordinarily a mixture of chemical compounds having somewhat different molecular weights and contain some compounds wherein the terminal glycidyl radicals are in hydrated form, the epoxy equivalency of the product is not necessarily the integer 2.0. However, in all cases it is a value greater than 1.0. The 1,2-epoxy equivalency of the polyethers thus is a value between 1.0 and 2.0. In other cases, the epoxide equivalency is given in terms of epoxide equivalents in 100 grams of the resin, and this may vary from about 0.03 to 0.70. Also, epoxide equivalent is often expressed as the number of grams of resin containing one equivalent of epoxide.

Resinous polymeric epoxides or glycidyl polyethers suitable for use in accordance with this invention may be prepared by admixing and reacting from one mol to two mol proportions of epihalohydrin, preferably epichlorohydrin, with about one mol proportion of bisphenol "A" in the presence of at least a stoichiometric excess of alkali based on the amount of halogen.

To prepare the resinous polymeric epoxides, aqueous alkali, bisphenol "A" and epichlorohydrin are introduced into and admixed in a reaction vessel. The aqueous alkali serves to dissolve the bisphenol "A" with the formation of the alkali salts thereof. If desired, the aqueous alkali and bisphenol "A" may be admixed first and then the epichlorohydrin added thereto, or an aqueous solution of alkali and bisphenol "A" may be added to the epichlorohydrin. In any case, the mixture is heated in the vessel to a temperature within the range of about 80° C. to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali. The resulting epoxy resins may be liquid or solid at room temperature, depending upon the proportions of reactants employed.

Various epoxy resins have given good results. Thus, the following may be used with success.

EXAMPLE VI

An epoxide resin having a melting point of 8–12° C., an epoxide equivalency of 190 to 210, and which has a viscosity of Z–5 to Z–6+ on the Gardner-Holdt scale. This resin is available commercially as Epon 828.

EXAMPLE VII

An epoxide resin having a melting point of 64–67° C., an epoxide equivalency of 450 to 525, and a 40% solution in butyl Carbitol has a viscosity of C–G on the Gardner-Holdt scale. This epoxy resin is commercially available as Epon 1001.

EXAMPLE VIII

An epoxide resin having a melting point of 97–103° C., an epoxide equivalency of 905 to 985, and a 40% solution in butyl Carbitol has a viscosity of R–T on the Gardner-Holdt scale. This resin is available commercially as Epon 1004.

EXAMPLE IX

An epoxide resin having a melting point of about 11° C. to 15° C., a specific gravity (23° C./23° C.) of from 1.16 to 1.18, an epoxy value of from 0.440 to 0.480 epoxide equivalent per 100 grams of resin, and a viscosity of Z–6 on the Gardner-Holdt scale. This resin is available commercially as Araldite 6020.

The following examples, in which boronates and nitrogen coordinated silicon compounds are employed as the catalyst, are illustrative of this invention. Parts given are by weight unless otherwise indicated.

EXAMPLE X

To 75 parts of the glycidyl polyether of Example IX, there are added 3.9 parts of n-propyl benzeneboronate and 5.2 parts of N-methyl-diethanolamine methylphenylsilane which was prepared in accordance with Example V, with continuous stirring during addition of the portions of curing catalyst.

The initial viscosity of catalyzed glycidyl polyether is Z–5 on the Gardner-Holdt scale. After standing at room temperature for one month the catalyzed resin increased in viscosity to Z–6. The catalyzed resin gelled in 15 minutes when heated to a temperature of 200° C. and when heated to a temperature of 135° C., the catalyzed glycidyl polyether gelled in one-half an hour.

EXAMPLE XI

To 75 parts of glycidyl polyether of Example VI, there are added 3.9 parts of n-propyl benzeneboronate and 5.2 parts of N-methyldiethanolamine methyl phenyl silane prepared in accordance with Example V with continuous stirring during addition. The catalyzed resin has an original viscosity of Z–3 on the Gardner-Holdt scale. After standing at room temperature for one month the viscosity increased to Z–5. The catalyzed glycidyl polyether gelled in 1½ hours when heated to a temperature of 135° C., and gelled in one-half an hour upon being heated to a temperature of 200° C.

EXAMPLE XII

To 75 parts of the glycidyl polyether of Example IX, there are added 3.8 parts of n-propyl benzeneboronate and 9.65 parts of the nitrogen coordinated silicon compound of Example IV, with continuous stirring. The catalyzed glycidyl polyether has an initial viscosity of Z–4 on the Gardner-Holdt scale and after one month of standing at room temperature conditions, the viscosity of the catalyzed glycidyl polyether increased to Z–6. Upon heating the catalyzed resin to a temperature of 135° C., the resin gelled in one-half an hour, and upon heating to a temperature of 200° C., the resin gelled in about 15 minutes.

EXAMPLE XIII

To 75 parts of the glycidyl polyether of Example IX, there are added 3.8 parts of n-propyl benzeneboronate and 8.65 parts of the nitrogen coordinated silicon compound of Example III, with continuous stirring. The catalyzed glycidyl polyether gelled in about six hours when heated to a temperature of 135° C., and gelled in ¾ of an hour when heated to a temperature of about 200° C.

The catalyzed resins of Examples X and XI were further cured at 135° C. for a period of 24 hours. The cured resins had electrical properties as indicated in Table III below.

Table III

| Example No. | Test Temperature, °C. | Power Factor 100 × tan δ | | Dielectric Constant | |
|---|---|---|---|---|---|
| | | 60 Cy. | 1 Kcy. | 60 Cy. | 1 Kcy. |
| X | 24 | 0.32 | 0.47 | 3.24 | 3.22 |
| | 100 | 0.57 | 0.89 | 3.45 | 3.41 |
| | 150 | 9.50 | 2.69 | 4.08 | 3.81 |
| XI | 24 | 0.28 | 0.36 | 3.58 | 3.55 |
| | 100 | 0.66 | 0.55 | 3.74 | 3.70 |
| | 150 | 6.74 | 3.82 | 4.34 | 4.08 |

In Table IV below there is set forth the hardness of the gelled catalyzed resins of Examples X, XI, XII and XIII after heating at specified temperatures.

Table IV

| Example No. | Temp., °C. | Gel Time in hours | Shore Hardness, "D" Scale |
|---|---|---|---|
| X | 135 | ½ | 85 |
| | 150 | ½ | 90 |
| | 200 | ¼ | 85 |
| XI | 135 | 1½ | 83 |
| | 150 | ¾ | 86 |
| | 200 | ½ | 86 |
| XII | 135 | 6 | 82 |
| | 150 | 2¼ | 85 |
| | 200 | ¾ | 85 |
| XIII | 135 | ½ | 89 |
| | 150 | ¼ | 87 |
| | 200 | ¼ | 84 |

In the following examples, borates and nitrogen coordinated silicon compounds are employed as the curing catalysts for glycidyl polyethers. All parts are by weight.

EXAMPLE XIV

To 200 parts of the glycidyl polyether of Example IX, there are added 11.8 parts of n-butyl borate and 8.1 parts of the nitrogen coordinated silicon compound of Example III, with continuous stirring. The viscosity of the resulting resin catalyzed mixture is Z–1 on the Gardner-Holdt scale. It is to be noted that the glycidyl polyether of Example IX, without the addition of any catalysts has a viscosity of Z–6 on the Gardner-Holdt scale. Thus the viscosity of the glycidyl polyether has been reduced by this addition, thereby permitting more complete penetration and impregnation of electrical apparatus to which this mixture is applied. On standing at room temperature, the catalyzed glycidyl polyether reached a viscosity of Z–3 after one month and Z–4 after two months. Upon heating to a temperature of 135° C., the catalyzed glycidyl polyether gelled in one hour, and upon heating to a temperature of 200° C., the catalyzed resin gelled in ¾ of an hour.

EXAMPLE XV

To 200 parts of the glycidyl polyether of Example IX, there are added, with stirring, 9.1 parts of trihexylene glycol biborate and 8.1 parts of the nitrogen coordinated silicon compound of Example III. The viscosity of the catalyzed glycidyl polyether increased from Z–5 (its initial viscosity) to Z–6 on the Gardner-Holdt scale after standing for one month at room temperature conditions. Upon being heated to a temperature of about 135° C. for one hour, the catalyzed resin gelled, and after heating for one-half hour at 200° C., the resin gelled.

EXAMPLE XVI

To 200 parts of the glycidyl polyether of Example IX, there are added, with continuous stirring, 16.9 parts of tri-m-p-cresyl borate and 8.1 parts of the nitrogen coordinated silicon compound of Example III. The original viscosity of the catalyzed glycidyl polyether is Z–5 on the Gardner-Holdt scale and after standing for one month at room temperature conditions, the viscosity of the catalyzed resin increased to Z–6. The catalyzed resin gelled in one hour when heated to a temperature of 135° C., and in ¾ of an hour when heated to a temperature of 200° C.

EXAMPLE XVII

To 100 parts of the glycidyl polyether of Example IX, there are added, with stirring, 11.7 parts of n-butyl borate and 8.5 parts of the nitrogen coordinated silicon compound of Example II. The original viscosity of the catalyzed glycidyl polyether is Y on the Gardner-Holdt scale and upon standing for one month at room temperature conditions, the viscosity of the catalyzed resin increased to Z–1. The catalyzed resin gelled in one hour when heated to a temperature of 135° C., and in ¾ of an hour, when heated to a temperature of 200° C.

EXAMPLE XVIII

To 100 parts of the glycidyl polyether of Example IX, there are added, with stirring, 5.9 parts of n-butyl borate and 4.23 parts of the nitrogen coordinated silicon compound of Example II. The original viscosity of the mixture is Z–2 on the Gardner-Holdt scale and upon standing for one month at room temperature conditions, the viscosity of the mixture increased to Z–4. The catalyzed resin gelled in one and one-half hours when heated to a temperature of about 135° C.

EXAMPLE XIX

To 100 parts of the glycidyl polyether of Example IX, there are added, with continuous stirring, 5.8 parts of n-butyl borate and 6.3 parts of the nitrogen coordinated silicon compound of Example I. The catalyzed glycidyl polyether gelled in four hours when heated to a temperature of 200° C., and in six hours when heated to a temperature of about 150° C.

In Table V below there is set forth the electrical properties of some of the catalyzed resins of the above examples.

Table V

| Catalyzed Resin of Example | Cure Conditions | Test Temperature, °C. | Power Factor 100 × tan δ | | Dielectric Constant | |
|---|---|---|---|---|---|---|
| | | | 60 Cy. | 1 Kcy. | 60 Cy. | 1 Kcy. |
| XIV | 48 hours at 135° C. | 24 | 0.23 | 0.30 | 3.51 | 3.51 |
| | | 100 | 4.34 | 2.61 | 4.19 | 3.94 |
| | | 150 | 8.41 | 5.96 | 5.27 | 5.07 |
| XV | do | 24 | 0.28 | 0.21 | 3.56 | 3.55 |
| | | 100 | 0.49 | 0.35 | 3.76 | 3.74 |
| | | 150 | 9.32 | 6.28 | 5.34 | 4.77 |
| XVII | do | 24 | 0.30 | 0.37 | 3.49 | 3.49 |
| | | 100 | 3.10 | 1.98 | 4.06 | 3.83 |
| | | 150 | 8.35 | 6.20 | 5.73 | 5.27 |
| XVIII | 72 hours at 135° C. | 24 | 0.26 | 0.36 | 3.57 | 3.55 |
| | | 100 | 1.10 | 0.75 | 3.81 | 3.75 |
| | | 150 | 6.70 | 3.75 | 5.20 | 4.90 |

In Table VI below there is set forth the hardness of the catalyzed resins of the above examples after heating at certain temperatures until the catalyzed resin gelled.

Table VI

| Example No. | Temperature, °C. | Gel Time in Hours | Shore Hardness, "D" Scale |
|---|---|---|---|
| XIV | 135 | 1 | 85 |
| | 150 | ¾ | 84 |
| | 200 | ¾ | 80 |
| XV | 135 | 1½ | 83 |
| | 150 | 1½ | 84 |
| | 200 | ½ | 81 |
| XVI | 135 | 1 | 85 |
| | 150 | 1 | 85 |
| | 200 | ¾ | 84 |
| XVII | 135 | 1 | 85 |
| | 150 | ¾ | 85 |
| | 200 | ¾ | 82 |
| XVIII | 135 | 1½ | 86 |
| | 150 | 1½ | 85 |
| | 200 | 1½ | 85 |

The borate esters, the boronate esters and the nitrogen coordinated silicon compounds will dissolve readily in the glycidyl polyethers and form homogeneous compositions. The resultant solution is liquid and may be stored for several months at room temperature without any appreciable increase in viscosity.

It is a particularly important feature of this invention, however, that when the catalyzed glycidyl polyether mixture is subjected to elevated temperatures of from about 100° C. to 200° C. and higher, the liquid polyether catalyst mixture readily reacts to form a hard, tough, cured resinous product. Such products exhibit low electrical losses over substantially all temperatures at which electrical apparatus to which it is applied operates.

Glycidyl polyethers catalyzed with the curing catalyst mixture of this invention are particularly suitable for electrical insulating applications. Thus, solutions of the glycidyl polyethers and curing catalysts may be applied to electrical wires, cables, coils, windings and the like as parting, impregnating and coating resins and varnishes. Upon being subjected to heat, any solvent which may be present in the polyether-curing catalyst mixtures evaporates and the liquid polyether cures to a hard, tough resinous mass. These catalyzed glycidyl polyether compositions also may be employed for parting and casting applications. Laminated magnetic cores, for example, may be dipped in such liquid compositions, using vacuum and pressure if necessary, and the compositions will readily fill all of the spaces between laminations. On heating, the composition between the laminations cures to a hard, tough, adhesive binder holding the laminations in position to produce a solid core which is extremely resistant to delamination and may be cut into core segments without rupture. Electrical transformers, rectifiers and electronic components of various kinds may be parted or cast within the completely reactive catalyzed glycidyl polyether compositions of this invention.

The compositions comprising the epoxy resin, and the borate esters and/or boronate esters, and the nitrogen coordinated silicon compounds are excellent adhesives. Thin coatings may be applied to metal, wood, porcelain, paper, plastics such as phenolic laminates, and when the coated surfaces are superimposed under moderate pressures and heated to temperatures of from about 100° C. to 200° C., unusually good bonds are obtained.

Glycidyl polyethers which are cured using the catalytic mixtures of this invention may be admixed with solids such as silica, titanium dioxide, glass fibers, wood flour, mica, graphite and calcium silicate. In some instances, small amounts of up to 50% of the weight of the composition of other resins, such as phenolics, polyesters, such as glycol maleates, and alkyd resins, may be admixed with the glycidyl polyethers in the practice of the present invention.

In order to indicate more specifically the advantages and capabilities of the curing catalytic mixture of the present invention, the following example is given.

EXAMPLE XX

A small transformer is impregnated with a quantity of the catalyzed polyether mixture prepared as described in Example XVII. The catalyzed polyether mixture is applied to the transformer in an impregnation tank under pressure. After curing at a temperature of about 135° C. for about three hours, and three hours at 120° C., the transformer was completely impregnated with a tough, hard resin having excellent electrical insulating properties.

The glycidyl polyether-catalytic mixtures of this invention are useful as casting resins, mica bonds, surface coatings, moldings, adhesives, sealants, resin products generally, and insulation of all kinds for electrical equipment.

While the present invention has been described with reference to particular embodiments thereof, it will be understood, of course, that certain changes, modifications, and substitutions may be made therein without departing from its scope.

I claim as my invention:

1. A composition of matter comprising (1) a reactive glycidyl polyether derived from a dihydric phenol and an epihalohydrin and (2) a curing catalyst therefor comprising a mixture of (a) from 2% to 20% by weight, based on the weight of the polyether, of at least one boron ester selected from the group consisting of esters of boric acid having the formula

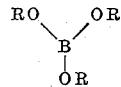

and esters of boronic acids having the formula

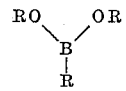

wherein R is a radical selected from at least one of the group consisting of alkyl radicals having from 1 to 6 carbon atoms, the cyclohexyl radical, and aryl radicals and (b) from 2% to 25% by weight, based on the weight of the polyether, of at least one nitrogen coordinated silicon compound which comprises the heat reaction product derived by reacting from one mol to two mols of an alkanolamine and one mol of an organosilicon compound having the formula $(R)_{4-n}$—Si—$(OR)_n$ wherein R represents radicals selected from at least one of the group consisting of alkyl radicals having from 1 to 6 carbon atoms, the cyclohexyl radical, and aryl radicals and wherein $n$ is an integer having a value of from 1 to 4, inclusive.

2. A composition of matter comprising (1) a reactive glycidyl polyether derived from a dihydric phenol and an epihalohydrin and (2) a curing catalyst therefor comprising a mixture of (a) from 2% to 20% by weight, based on the weight of the polyether, of at least one boron ester selected from the group consisting of esters of boric acid having the formula $$\begin{array}{c} RO \quad OR \\ \diagdown \diagup \\ B \\ | \\ OR \end{array}$$

and esters of boronic acids having the formula $$\begin{array}{c} RO \quad OR \\ \diagdown \diagup \\ B \\ | \\ R \end{array}$$

wherein R is a radical selected from at least one of the group consisting of alkyl radicals having from 1 to 6 carbon atoms, the cyclohexyl radical, and aryl radicals and (b) from 2% to 25% by weight, based on the weight of the polyether, of at least one nitrogen coordinated silicon compound which comprises the heat reaction product derived by admixing one mol of an alkanolamine and one mol of an organosilicon compound having the formula $(R)_{4-n}$—Si—$(OR)_n$ wherein R represents radicals selected from at least one of the group consisting of alkyl radicals having from 1 to 6 carbon atoms, the cyclohexyl radical, and aryl radicals and wherein $n$ is an integer having a value of from 1 to 4, inclusive, heating the admixture to reflux and refluxing the admixture until substantially all alcohol formed during the reaction is removed.

3. A composition of matter comprising (1) a reactive glycidyl polyether derived from a dihydric phenol and an epihalohydrin and (2) a curing catalyst therefor comprising a mixture of (a) from 2% to 20% by weight, based on the weight of the polyether, of at least one boron ester selected from the group consisting of esters of boric acid having the formula

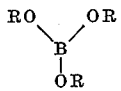

and esters or boronic acids having the formula

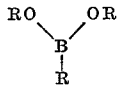

wherein R is a radical selected from at least one of the group consisting of alkyl radicals having from 1 to 6 carbon atoms, the cyclohexyl radical, and aryl radicals and (b) from 2% to 25% by weight, based on the weight of the polyether, of at least one nitrogen coordinated silicon compound which comprises the heat reaction product derived by admixing two mols of an alkanolamine and one mol of an organosilicon compound having the formula $(R)_{4-n}$—Si—$(OR)_n$ wherein R represents radicals selected from at least one of the group consisting of alkyl radicals having from 1 to 6 carbon atoms, the cyclohexyl radical, and aryl radicals and wherein $n$ is an integer having a value of from 1 to 4, inclusive and refluxing the admixture until at least two mols of alcohol formed during the reaction is removed.

4. The process of producing a resinous product which comprises admixing a glycidyl polyether of a dihydric phenol and an epihalohydrin with from 2% to 20% by weight, based on the weight of the polyether, of at least one boron ester selected from the group consisting of esters of boric acid having the formula

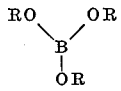

and esters of boronic acids having the formula

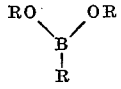

wherein R is a radical selected from at least one of the group consisting of alkyl radicals having from 1 to 6 carbon atoms, the cyclohexyl radical, and aryl radicals, and from 2% to 25% by weight, based on the weight of the polyether, of at least one nitrogen coordinated silicon compound which comprises the heat reaction product derived by reacting from one mol to two mols of an alkanolamine and one mol of an organosilicon compound having the formula $(R)_{4-n}$—Si—$(OR)_n$ wherein R represents radicals selected from at least one of the group consisting of alkyl radicals having from 1 to 6 carbon atoms, the cyclohexyl radical, and aryl radicals and wherein $n$ is an integer having a value of 1 to 4, inclusive, heating the mixture at temperatures of from about 100° C. to about 200° C. to produce a hard, cured resinous product.

5. The process of claim 4 wherein the glycidyl polyether is the product obtained by reacting 4,4'-dihydroxy-diphenyl-dimethyl-methane and epichlorohydrin in an alkaline medium.

6. The cured resinous product produced by the process of claim 4.

7. An insulated electrical member comprising an electrical conductor and cured, resinous insulation applied to the conductor, the resinous insulation comprising the reaction product of a glycidyl polyether of a dihydric phenol and an epihalohydrin, and from 2% to 20% by weight, based on the weight of the glycidyl polyether, of at least one boron ester selected from the group consisting of esters of boric acid having the formula

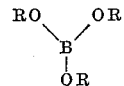

and esters of boronic acids having the formula

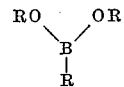

wherein R is a radical selected from at least one of the group consisting of alkyl radicals having from 1 to 6 carbon atoms, the cyclohexyl radical, and aryl radicals, and from 2% to 25% by weight, based on the weight of the polyether, of at least one nitrogen coordinated silicon compound which comprises the heat reaction product derived by reacting from one mol to two mols of an alkanolamine and one mol of an organosilicon compound having the formula $(R)_{4-n}$—Si—$(OR)_n$ wherein R represents radicals selected from at least one of the group consisting of alkyl radicals having from 1 to 6 carbon atoms, the cyclohexyl radical, and aryl radicals and wherein $n$ is an integer having a value of 1 to 4, inclusive.

8. The insulated electrical member as set forth in claim 7 wherein the resinous insulation contains finely divided inorganic filler material.

9. A composition of matter adapted for the curing of glycidyl polyethers comprising (a) from 2% to 20% by weight, based on the weight of the polyether, of at least one boron ester selected from the group consisting of esters of boric acid having the formula

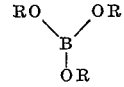

and esters of boronic acids having the formula

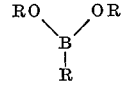

wherein R is a radical selected from at least one of the group consisting of alkyl radicals having from 1 to 6 carbon atoms, the cyclohexyl radical, and aryl radicals and (b) from 2% to 25% by weight, based on the weight of the polyether, of at least one nitrogen coordinated silicon compound which comprises the heat reaction product derived by reacting from one mol to two mols of an alkanolamine and one mol of an organosilicon compound having the formula $(R)_{4-n}$—Si—$(OR)_n$ wherein R represents radicals selected from at least one of the group consisting of alkyl radicals having from 1 to 6 carbon atoms, the cyclohexyl radical, and aryl radicals and wherein $n$ is an integer having a value of from 1 to 4, inclusive.

No references cited.